(12) United States Patent
Hernacki

(10) Patent No.: US 9,424,408 B2
(45) Date of Patent: Aug. 23, 2016

(54) UTILIZING LOCATION INFORMATION TO MINIMIZE USER INTERACTION REQUIRED FOR AUTHENTICATION ON A DEVICE

(75) Inventor: Brian Hernacki, San Carlos, CA (US)

(73) Assignee: QUALCOMM Incorporated, San Diego, CA (US)

(*) Notice: Subject to any disclaimer, the term of this patent is extended or adjusted under 35 U.S.C. 154(b) by 1537 days.

(21) Appl. No.: 12/643,797

(22) Filed: Dec. 21, 2009

(65) Prior Publication Data

US 2011/0154434 A1    Jun. 23, 2011

(51) Int. Cl.
*G06F 21/62* (2013.01)
*G06F 21/31* (2013.01)

(52) U.S. Cl.
CPC ...................................... *G06F 21/31* (2013.01)

(58) Field of Classification Search
USPC .................. 380/256; 713/169, 200; 726/1–3, 726/27–29; 342/450, 457; 455/456.1, 455/456.3, 410; 709/220, 223, 225, 227
See application file for complete search history.

(56) References Cited

U.S. PATENT DOCUMENTS

| 6,370,629 | B1* | 4/2002 | Hastings et al. | 711/163 |
| 6,778,837 | B2* | 8/2004 | Bade et al. | 455/456.1 |
| 2003/0184474 | A1* | 10/2003 | Bajikar | 342/450 |
| 2006/0136327 | A1* | 6/2006 | You | 705/38 |
| 2007/0157319 | A1* | 7/2007 | Kammer et al. | 726/27 |
| 2010/0167693 | A1* | 7/2010 | Yamada | 455/411 |
| 2010/0306392 | A1* | 12/2010 | Fell et al. | 709/228 |
| 2011/0060808 | A1* | 3/2011 | Martin et al. | 709/217 |

* cited by examiner

*Primary Examiner* — Izunna Okeke
*Assistant Examiner* — Hee Song
(74) *Attorney, Agent, or Firm* — Norton Rose Fulbright US LLP

(57) ABSTRACT

A system and a method are disclosed for authenticating a user of a mobile computing device. Information is received describing the location of the mobile computing device. The information can include the current location of the device or a current type of user activity associated with a location. A current timeout length is determined based on this information. If the mobile computing device has remained idle for a time period equal to the current timeout length, the user of the mobile computing device is authenticated.

24 Claims, 5 Drawing Sheets

UTILIZING LOCATION INFORMATION TO MINIMIZE USER INTERACTION REQUIRED FOR AUTHENTICATION ON A DEVICE

BACKGROUND

1. Field of Art

The disclosure generally relates to the field of user interfaces for authentication on electronic devices.

2. Description of Art

It is often desirable to authenticate a user of a computing device, e.g., a mobile computing device. Many computing devices perform this authentication by requiring the user to enter a password before being able to use the device or access information in the device. This protects sensitive data in the device from being accessed by an unauthorized person (e.g., someone who steals the device). In many computing devices, a password is required after a period of inactivity on the device. For example, if a user has not pressed any buttons on the device for five minutes, the user is prompted for a password the next time the user attempts to use the device. This period of inactivity is referred to as a timeout.

The timeout length can be set to balance convenience and security. A very short timeout length, such as 1 minute, may excessively inconvenience the user, since the user will need to re-enter the password even if the device is left idle for a short time. A very long timeout length, such as 1 hour, may not provide enough security, making it more likely that an unauthorized user will be able to access the device without entering a password. An appropriately chosen timeout length can improve security and lessen the inconvenience of the user.

There is lacking, inter alia, a system and method to choose an appropriate timeout length for authenticating a user of a computing device that balances security and convenience.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

One embodiment of a disclosed system, method and computer readable storage medium is configured to authenticate a user of a mobile computing device using a variable timeout length. Several policies are created, where each policy includes an indication of a region of the earth's surface and an authentication timeout length. The authentication timeout length is based on a likelihood of unauthorized use of the mobile computing device within the region. A current location of the mobile computing device is received, and a policy that includes an indication of a region containing the current location is selected. A current timeout length is determined, where the current timeout length is chosen to be the timeout length of the selected policy. If the mobile computing device has not received a user input for a time period equal to the current timeout length, the mobile computing device is locked. This locking includes preventing access to information on the mobile computing device by the user until a password is received by the user.

Example Mobile Computing Device

Figure 1B:
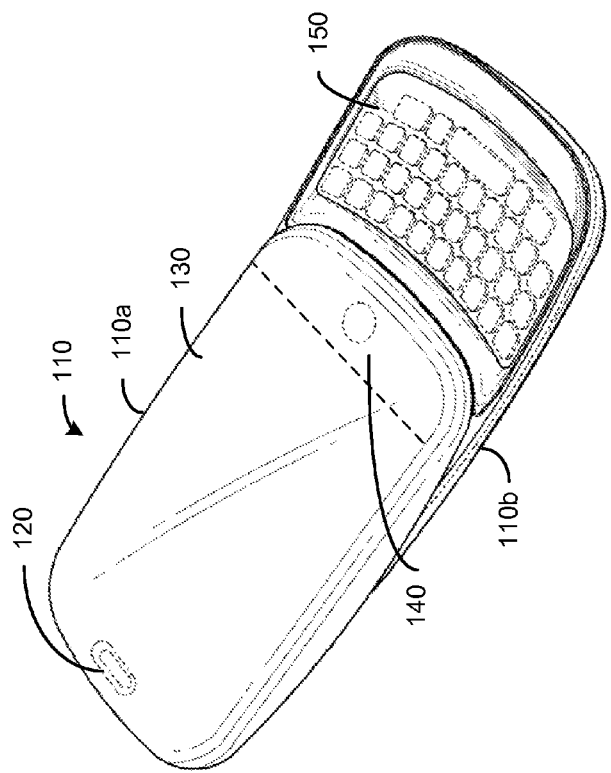
FIG. 1b illustrates one embodiment of the mobile computing device in a second positional state.
Figure 1A:
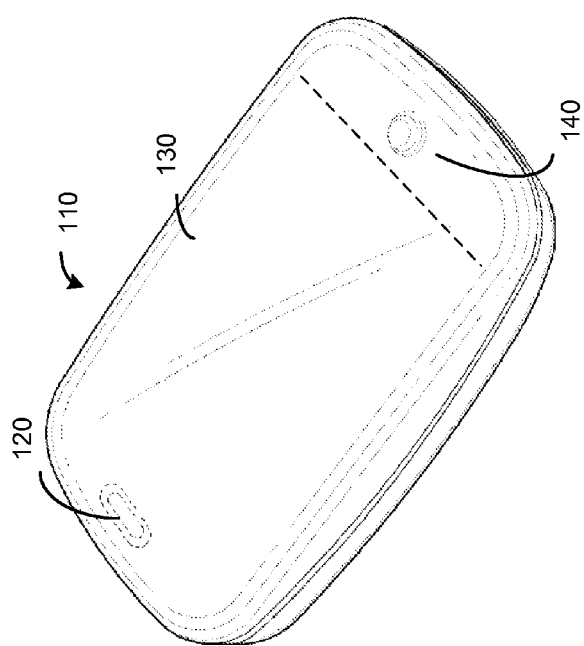
FIG. 1a illustrates one embodiment of a mobile computing device in a first positional state.

In one example embodiment, the configuration as disclosed may be configured for use between a mobile computing device, that may be host device, and an accessory device. FIGS. 1a and 1b illustrate one embodiment of a mobile computing device 110. FIG. 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, smartphone, netbook, or laptop computer. The mobile computing device 110 is configured to host and execute a phone application for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. Likewise, the mobile computing device 110 is only by way of example, and the principles of its functionality apply to other computing devices, e.g., desktop computers, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
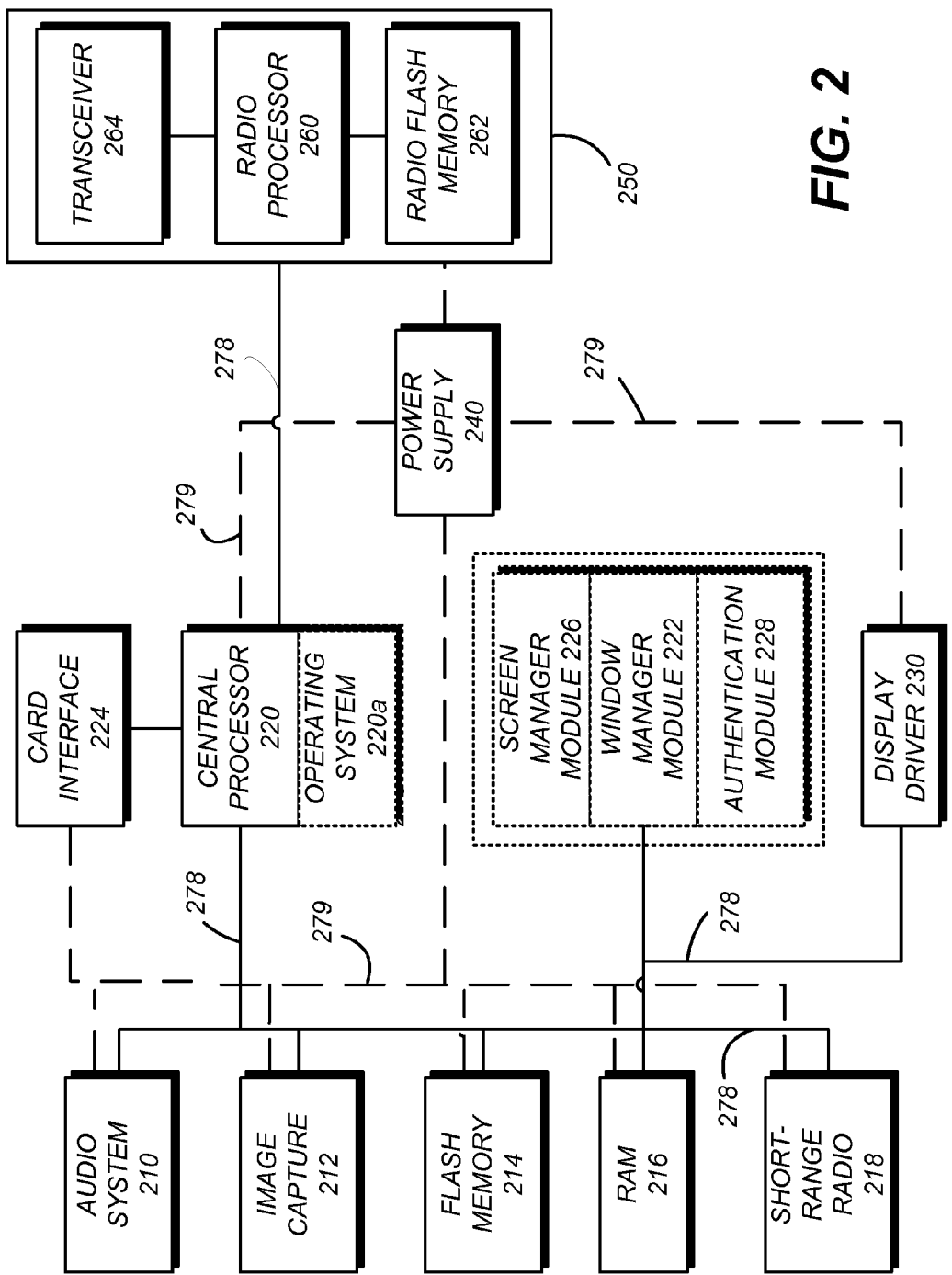
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIGS. 1a and 1b. The mobile computing device 110 includes a central processor 220, a power supply 240, and a radio subsystem 250. Examples of a central processor 220 include processing chips and system based on architectures such as ARM (including cores made by microprocessor manufacturers), ARM XSCALE, AMD ATHLON, SEMPRON or PHENOM, INTEL XSCALE, CELERON, CORE, PENTIUM or ITANIUM, IBM CELL, POWER ARCHITECTURE, SUN SPARC and the like.

The central processor 220 is configured for operation with a computer operating system. The operating system is an interface between hardware and an application, with which a user typically interfaces. The operating system is responsible for the management and coordination of activities and the sharing of resources of the mobile computing device 110. The operating system provides a host environment for applications that are run on the mobile computing device 110. As a host, one of the purposes of an operating system is to handle the details of the operation of the mobile computing device 110. Examples of an operating system include PALM OS and WEBOS, MICROSOFT WINDOWS (including WINDOWS 7, WINDOWS CE, and WINDOWS MOBILE), SYMBIAN OS, RIM BLACKBERRY OS, APPLE OS (including MAC OS and IPHONE OS), GOOGLE ANDROID, and LINUX.

The central processor 220 communicates with an audio system 210, an image capture subsystem (e.g., camera, video or scanner) 212, flash memory 214, RAM memory 216, and a short range radio module 218 (e.g., Bluetooth, Wireless Fidelity (WiFi) component (e.g., IEEE 802.11)). The central processor communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

The central processor communicates with applications executing within the mobile computing device 110 through the operating system 220a. In addition, intermediary components, for example, a window manager module 222 and a screen manager module 226, provide additional communication channels between the central processor 220 and operating system 220 and system components, for example, the display driver 230.

In one embodiment, the window manager module 222 comprises a software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises a software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

A authentication module 228 comprises software that is, for example, integrated with the operating system or configured to be an application operational with the operating system. In some embodiments it may comprise firmware, for example, stored in the flash memory 214. The authentication module 228 is configured to authenticate a user of the mobile computing device 110 and to set a variable timeout length for the authentication. The variable timeout length is based on the current location of the mobile computing device 110, the current type of use of the mobile computing device and/or on the policies stored in the mobile computing device. The authentication performed by the authentication module may comprise asking the user to enter a password after the timeout length has passed before the user is allowed to use the mobile computing device 110. The authentication module 228 enables varying levels of security based on the location of the mobile computing device 110.

It is noted that in one embodiment, central processor 220 executes logic (e.g., by way of programming, code, or instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate, wirelessly or wired, with external accessories (or peripherals), for example, media cards inserted into the expansion slot (not shown). The card interface 224 transmits data and/or instructions between the central processor and an accessory, e.g., an expansion card or media card, coupled within the expansion slot. The card interface 224 also transmits control signals from the central processor 220 to the expansion slot to configure the accessory. It is noted that the card interface 224 is described with respect to an expansion card or media card; it also may be structurally configured to couple with other types of external devices for the device 110, for example, an inductive charging station for the power supply 240 or a printing device.

User Authentication with Variable Timeout Length

Figure 3:
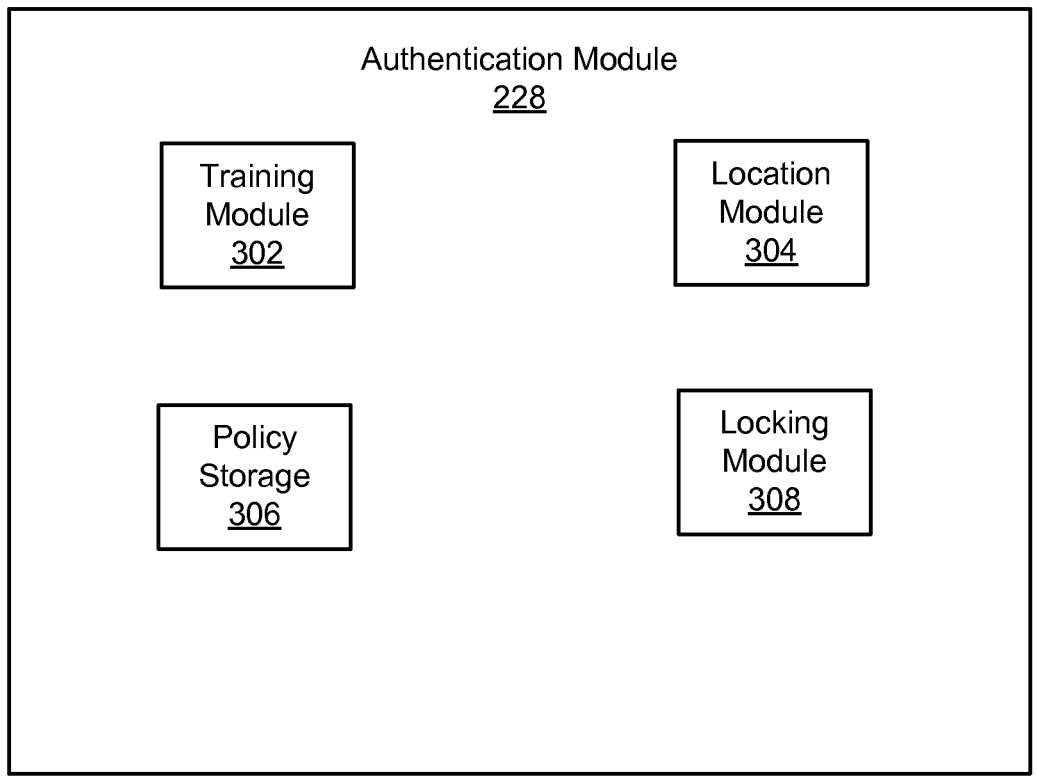
FIG. 3 is a block diagram illustrating one embodiment of the authentication module.

FIG. 3 is a block diagram illustrating the authentication module 228, in one embodiment. The authentication module includes a training module 302, a location module 304, a locking module 308, and a policy storage 306. The location module is configured to determine the current location of the mobile computing device 110. The training module 302 is configured to associate various locations and/or user activities with particular timeout lengths and create policies for storage in the policy storage 306. The locking module 308 is configured to lock the mobile computing device 110 and require user authentication after a timeout length based on current location and the policies in the policy storage 306. These modules are discussed further below.

Figure 4:
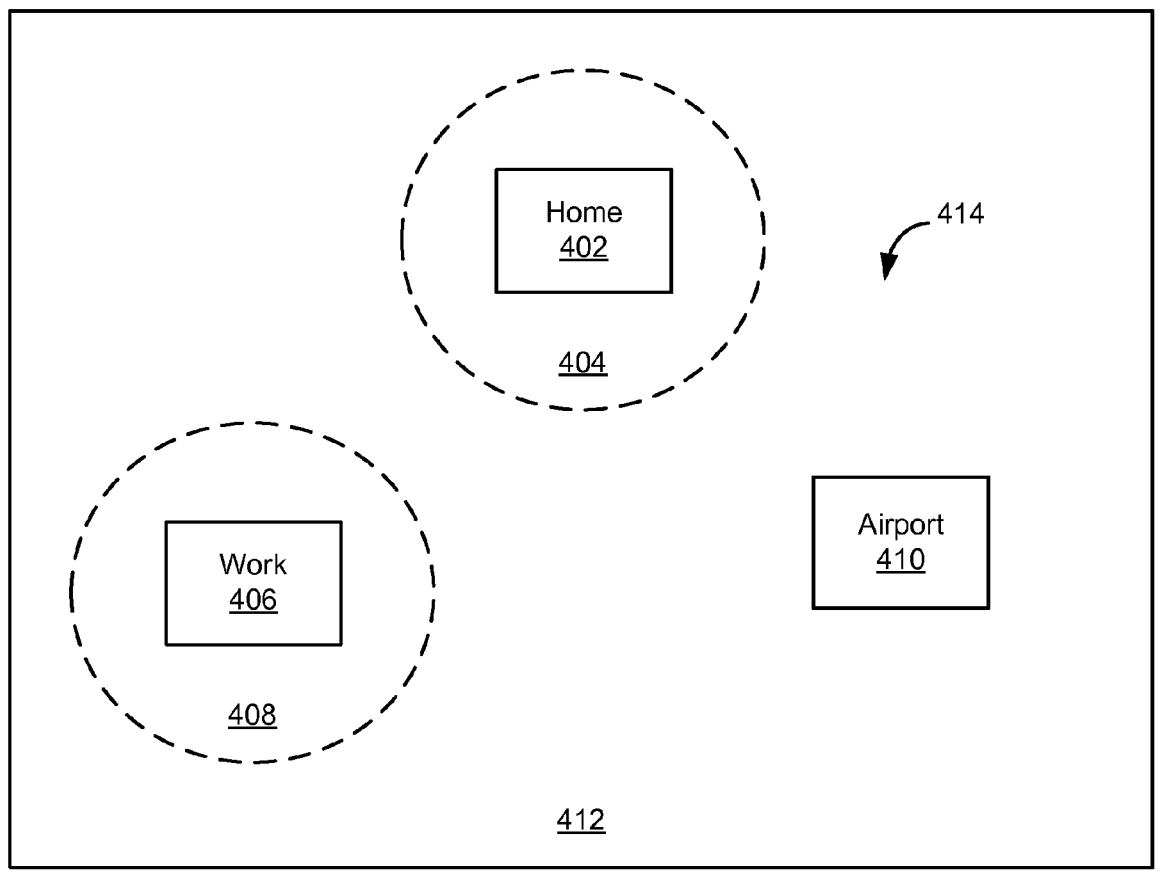
FIG. 4 illustrates one embodiment of a map showing various locations where a mobile computing device may be used.

FIG. 4 illustrates a map 412 showing various locations where a mobile computing device 110 may be used, in one embodiment. The map 412 covers a region of the earth's surface containing the user's home 402 (e.g., house), the user's work 408 (e.g., work building), and a nearby airport 410 where the user may occasionally spend time. The user may use a mobile computing device 110 at any of these locations or at other locations.

After using the mobile computing device, the user may put the device down where it may be accessed by other people. For example, a user at work 408 may check emails using the mobile computing device 110, then place it on his desk while eating lunch in another room, and then come back to his desk and use the mobile computing device to check emails again. While the device is unattended on his desk, it is possible that someone else may pick it up and begin using it to view private emails or perform other unauthorized activities. It is also possible that a user may accidentally misplace the mobile computing device. For example, a mobile computing device 110 may fall out of a user's pocket at the airport 410 and be picked up by someone who uses the device to access confidential documents. Further, it is possible that the mobile computing device may be stolen and used by the thief.

To protect against the unauthorized use of the mobile computing device, the authentication module 228 can lock the device and require user authentication (e.g., by requiring a password) after the device has been not been used for a certain length of time, referred to here as a timeout length. In one embodiment, the authentication module chooses the timeout length based on the location (or likely location) of the mobile computing device 110. For example, at a user's home 402, the timeout can be set to a long period of time (e.g., a time between 20 to 30 minutes) or the timeout can be infinite, so that the device never locks. This is because a user's home represents a low security risk and a short timeout unnecessarily inconveniences the user by requiring the user to re-enter a password even after a short break from using the device. In a public place (e.g., airport 410), the timeout can be short (e.g., a time of 1 or 2 minutes) since it is possible that the device may be used by an unauthorized stranger even just a few minutes after the authorized user has finished using the device. The user's workplace may represent a medium-level security risk and may therefore have a moderate timeout (e.g., a time between 5 to 10 minutes).

For the purposes of setting a timeout length, locations can be defined as certain regions on map 412. For example, the home location can be considered anything within region 404, which represents a circle of a particular radius (e.g., 300 feet) centered at some point within the user's home 402. The work region 408 may similarly be a circle of a particular radius centered at some point within the user's work 406. An "unknown" or "other" region 414 may comprise all other locations, including airport 410.

Example Process Configuration

Figure 5:
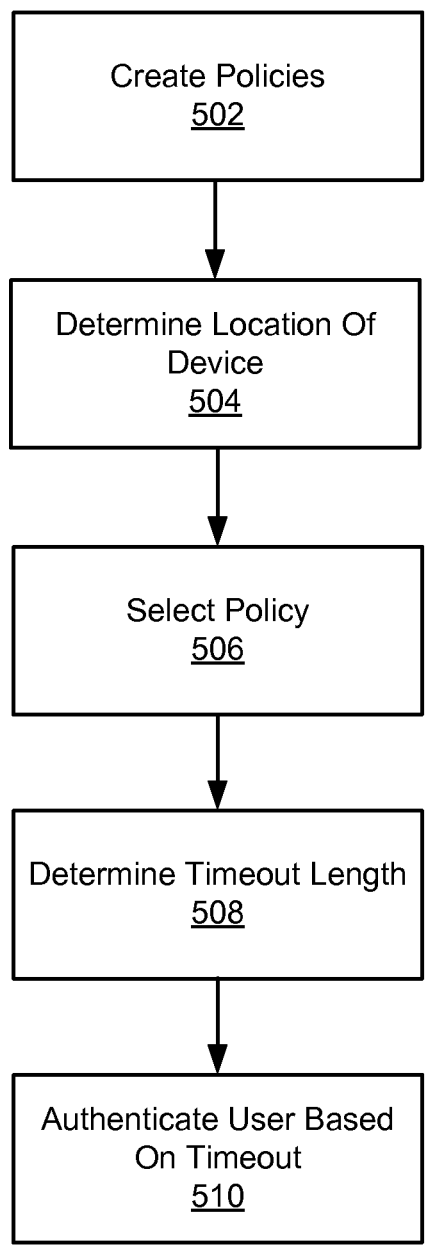
FIG. 5 is a flowchart illustrating one embodiment of a method for authenticating a user of a mobile computing device.

FIG. 5 is a flowchart illustrating an example of a process for authenticating a user of a mobile computing device 110, in one embodiment. In step 502, policies are created for determining authentication timeouts based on the location. These policies may be created by the training module 302. Policies can specify properties associated with a particular region. A policy may specify the locations on a map 412 that correspond to the region and an authentication timeout for the region. The policy may also specify typical usage patterns of the mobile computing device 110 associated with a region. These types of usage may include, for example, the duration of use of the mobile computing device, the time of day of use, and the types of activities performed (e.g., email, calendar, web surfing, etc.).

For example, a 'Home' policy may specify that the home region 404 comprises all locations on map 412 within a radius of 300 feet from a particular point, where the point is specified by latitude and longitude or by street address. The 'Home' policy may further specify that this home region 404 has a timeout length of 30 minutes. The 'Home' policy may also specify that certain types of usage that are typical of the home region. For example, web surfing on Sunday evening may be specified as a type of usage in the 'Home' policy.

Default policies may be included in the policy storage 306 of the mobile computing device 110. Policies may also be created or edited by an administrator or user of the mobile computing device. For example, a policy editor may be provided by the training module 302 that allows a user to create a policy, associate the policy with a region selected on a map, and specify a timeout length for the policy. The user may be able to enter an address (e.g., home address) and have the address and nearby areas be associated with the policy. The user may be able to specify that the current location of the device should be associated with the policy. The training module can receive the current location of the device from the location module 304 and save this location to the policy. The policy editor may also allow a user to specify certain usage types associated with the policy. The default, edited, or created policies are stored in the policy storage 306.

In step 504, the current location of the mobile computing device 110 is determined by the location module 304, in one embodiment. In this example, the location module 304 determines the location using a global positioning system (GPS) receiver in the mobile computing device 110. Location information may also be determined based on the location of nearby cell phone towers or wireless networks that are detected by the mobile computing device. The location information determined by the location module may comprise a current latitude and longitude, for example.

In step 506, the authentication module 228 selects a current policy from the policy storage 306. If a current location was determined by the location module, then the authentication module may select a policy associated with a region of the map 412 that contains the current location. It is possible that a current location was not determined by the location module. This may occur, for example, if the mobile computing device is not able to determine its current location because it does not have a GPS receiver and is not currently picking up any cellular signals. As a result, a policy may be selected based on the recent type of usage of the mobile computing device. The authentication module 228 may classify the recent usage of the device into a particular type of usage and select a policy that matches this type of usage.

The authentication timeout is determined 508 based on the policy. As mentioned above, each policy is associated with a timeout length. The user is then authenticated 510 using the timeout length. In one embodiment, this authentication is performed by the locking module 308. The locking module may set a timer equal to the timeout length when the mobile computing device becomes idle. When the timer indicates that the timeout length has passed, the locking module can lock the device and require that the user enter a password in order to be able to use the device again.

The authentication process may take into account that the user (and device) may move from one location to another resulting in a change of the timeout length. In one embodiment, steps 506 to 508 may be periodically performed (e.g., once a minute) while the device is idle to determine if a new timeout length should be used. If a new timeout length is determined, then the locking module can appropriately modify the timer. For example, suppose the device becomes idle when at the home region 404, which is associated with a timeout of 20 minutes. Then, 8 minutes later, while the device is still idle, locking module is notified that the device has moved to the work region 408 (e.g., because the user drove to work with the device), where the timeout is 10 minutes. The locking module can then reset the timer to cause the device to lock in 2 minutes rather than allowing it to run for another 12 minutes. In one embodiment, rather than periodically performing steps 506 to 508, an asynchronous notification may be received if the location of the device changes. A callback may be set that causes a function to be called by the location module 304 when the device changes location. This function can cause a new policy to be selected and a new timeout length to be activated.

The disclosed embodiments beneficially allow for choosing an appropriate timeout length for authenticating a user of a mobile computing device based on the location of the device. Using different timeout lengths for different locations allows for necessary security to be maintained while not unnecessarily inconveniencing the user by requiring excessive authentication. A user that finds the authentication too inconvenient may disable it altogether, resulting in significantly decreased security. Using a short timeout length only when in insecure locations decreases the likelihood of the user taking such action.

Additional Configuration Considerations

Some portions of above description describe the embodiments in terms of algorithms and symbolic representations of operations on information, for example, as illustrated and described with respect to FIGS. 2, 3, 4, and 5. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for utilizing location information of a mobile computing device to perform user authentication through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for authenticating a user, comprising:

creating a plurality of policies, each policy comprising an indication of a region of a physical location and an authentication timeout length, the authentication timeout length based on a likelihood of unauthorized use of a mobile computing device within the region;

seeking information indicative of a current location of a mobile computing device;

if said current location of said mobile computing device is determined, selecting a policy of the plurality of policies comprising an indication of a region that includes the current location;

when said current location of said mobile computing device is not determined, selecting a policy of the plurality of policies based on recent types of usage of said mobile computing device;

determining a current timeout length comprising a timeout length of the selected policy; and responsive to the mobile computing device not receiving user input for a time period equal to the current timeout length, locking the mobile computing device, the locking comprising preventing access to information on the mobile computing device by the user until a password is received from the user.

2. The computer-implemented method of claim 1, further comprising:

with a policy editor, displaying a map from which a user selects a location to associate with a policy of the plurality of policies.

3. The computer-implemented method of claim 1, further comprising:

receiving an updated location of the mobile computing device;

selecting an updated policy comprising an indication of a region that includes the updated location;

determining an updated timeout length comprising a timeout length of the updated policy; and adjusting the current timeout length based on the updated timeout length.

4. A non-transitory computer readable storage medium configured to store instructions, the instructions when executed by a processor cause the processor to:

access a plurality of policies, each policy comprising an indication of an authentication timeout length, the authentication timeout length based on a likelihood of unauthorized use of a mobile computing device according to the corresponding policy;

seek information indicative of a current location of a mobile computing device;

if said current location of said mobile computing device is determined, select a policy of the plurality of policies comprising an indication of a region that includes the current location;

when said current location of said mobile computing device is not determined, select a policy of the plurality of policies based on recent types of usage of said mobile computing device;

determine a current timeout length comprising a timeout length of the selected policy; and responsive to the mobile computing device not receiving user input for a time period equal to the current timeout length, lock the mobile computing device, the locking comprising preventing access to information on the mobile computing device by a user until a password is received from the user.

5. The non-transitory computer readable medium of claim 4, wherein each policy of the plurality of policies further comprises an indication of a type of user activity on the mobile computing device, and further comprising instructions that cause the processor to:

determine a current type of user activity on the mobile computing device; and select a policy comprising an indication of the current type of user activity on the mobile computing device.

6. The non-transitory computer readable medium of claim 4, further comprising instructions that cause the processor to:

receive an updated location of the mobile computing device;

select an updated policy comprising an indication of a region that includes the updated location;

determine an updated timeout length comprising a timeout length of the updated policy; and adjust the current timeout length based on the updated timeout length.

7. A computer-implemented method for authenticating a user, comprising:

classifying recent usage of a mobile computing device into a particular type of usage of the mobile computing device;

seeking information indicative of a current location of the mobile computing device;

determining a current timeout length based on a policy corresponding to the particular type of usage that corresponds to the recent usage of the mobile computing device when the current location of the mobile computing device is not determined; and responsive to the mobile computing device remaining idle for a time period equal to the current timeout length, authenticating a user of the mobile computing device.

8. The computer-implemented method of claim 7, further comprising determining the current timeout length based on the information indicative of the current location of the mobile computing device.

9. The computer-implemented method of claim 8, wherein the information indicative of the current location of the mobile computing device comprises a current location of the mobile computing device, and wherein the current timeout length is associated with a region containing the current location.

10. The computer-implemented method of claim 8, further comprising, with a policy editor, displaying a map from which a user selects a location to associate with a timeout length to be used when the mobile computing device is at that location.

11. The computer-implemented method of claim 7, wherein the current timeout length is based on a likelihood of unauthorized use of the mobile computing device.

12. The computer-implemented method of claim 7, wherein authenticating a user of the mobile computing device further comprises:

locking the mobile computing device, the locking comprising preventing access to information on the mobile computing device by the user until a password is received from the user.

13. A non-transitory computer readable storage medium configured to store instructions, the instructions when executed by a processor cause the processor to:

classify recent usage of a mobile computing device into a particular type of usage of the mobile computing device;

seek information indicative of a current location of the mobile computing device;

determine a current timeout length based on a policy corresponding to the particular type of usage that corresponds to the recent usage of the mobile computing device when the current location of the mobile computing device is not determined; and responsive to the mobile computing device remaining idle for a time period equal to the current timeout length, authenticate a user of the mobile computing device.

14. The non-transitory computer readable medium of claim 13, further comprising instructions that cause the processor to:

determine the current timeout length based on the information indicative of the current location of the mobile computing device.

15. The non-transitory computer readable medium of claim 14, wherein the information indicative of the current location of the mobile computing device comprises a current location of the mobile computing device, and wherein the current timeout length is associated with a region containing the current location.

16. The non-transitory computer readable medium of claim 14, further comprising a policy editor for displaying a map from which a user selects a location to associate with a timeout length to be used when the mobile computing device is at that location.

17. The non-transitory computer readable medium of claim 13, wherein the current timeout length is based on a likelihood of unauthorized use of the mobile computing device.

18. The non-transitory computer readable medium of claim 13, wherein authenticating a user of the mobile computing device further comprises:

locking the mobile computing device, the locking comprising preventing access to information on the mobile computing device by the user until a password is received from the user.

19. A system for authenticating a user, comprising:

a computer processor for executing computer program instructions;

a computer-readable storage medium having computer program instructions, the instructions when executed by the computer processor cause the processor to:

display a map from which a user selects a location to associate with a timeout length to be used when a mobile computing device is at that location;

store a number of policies each associating a location selected by the user with a timeout length, wherein each location may be associated with a different timeout length;

receive information describing a current location of a mobile computing device;

determine a current timeout length based on the information describing the current location of the mobile computing device by selecting one of the policies of the number of policies that includes the current location of the mobile computing device; and responsive to the mobile computing device remaining idle for a time period equal to the current timeout length, authenticate a user of the mobile computing device.

20. The system of claim 19, wherein the instructions, when executed, further cause the processor to create a policy to be included in said number of policies by associating the current location of the mobile computing device with a specified timeout length.

21. The system of claim 19, wherein the instructions, when executed, further cause the processor to create a policy to be included in said number of policies by receiving an address input by a user and associating that address with a timeout length.

22. The system of claim 19, wherein the information describing the location of the mobile computing device comprises a current type of user activity of the mobile computing device, and wherein the current timeout length is associated with the current type of user activity of the mobile computing device.

23. The system of claim 19, wherein the current timeout length is based on a likelihood of unauthorized use of the mobile computing device.

24. The system of claim 19, wherein authenticating a user of the mobile computing device further comprises:
locking the mobile computing device, the locking comprising preventing access to information on the mobile computing device by the user until a password is received from the user.

* * * * *